(12) United States Patent
Kim et al.

(10) Patent No.: US 12,422,646 B2
(45) Date of Patent: Sep. 23, 2025

(54) OPTICAL IMAGING SYSTEM

(71) Applicant: Samsung Electro-Mechanics Co., Ltd., Suwon-si (KR)

(72) Inventors: Hag Chul Kim, Suwon-si (KR); Hwan Soo Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/877,061

(22) Filed: Jul. 29, 2022

(65) Prior Publication Data

US 2022/0365319 A1    Nov. 17, 2022

Related U.S. Application Data

(63) Continuation of application No. 16/299,637, filed on Mar. 12, 2019, now Pat. No. 11,422,339.

(30) Foreign Application Priority Data

Sep. 28, 2018    (KR) ........................ 10-2018-0115987

(51) Int. Cl.
*G02B 9/64*    (2006.01)
*G02B 1/04*    (2006.01)
(Continued)

(52) U.S. Cl.
CPC .............. *G02B 9/64* (2013.01); *G02B 1/041* (2013.01); *G02B 7/021* (2013.01);
(Continued)

(58) Field of Classification Search
CPC ........ G02B 1/041; G02B 7/021; G02B 7/028; G02B 9/64; G02B 13/0045; G02B 27/0025
(Continued)

(56) References Cited

U.S. PATENT DOCUMENTS 9,383,553 B2 *   7/2016   Shinohara .......... G02B 13/0045
9,952,413 B2     4/2018   Kitahara et al.
(Continued)

FOREIGN PATENT DOCUMENTS

CN    105988193 A    10/2016
CN    106199922 A    12/2016
(Continued)

OTHER PUBLICATIONS

Chinese Office Action issued on Apr. 28, 2021, in counterpart Chinese Patent Application No. 201910348975.6.(8 pages in English and 8 pages in Chinese).

(Continued)

*Primary Examiner* — Mahidere S Sahle
(74) *Attorney, Agent, or Firm* — NSIP Law

(57) ABSTRACT

An optical imaging system includes a first lens having a negative refractive power; a second lens having a negative refractive power; a third lens having a positive refractive power; a fourth lens having a negative refractive power; a fifth lens having a positive refractive power; a sixth lens having a positive refractive power; and a seventh lens having a negative refractive power. At least five of the lenses are made of a plastic material.

14 Claims, 7 Drawing Sheets

(51) Int. Cl.
*G02B 7/02* (2021.01)
*G02B 13/00* (2006.01)
*G02B 27/00* (2006.01)

(52) U.S. Cl.
CPC ..... *G02B 13/0045* (2013.01); *G02B 27/0025* (2013.01); *G02B 7/028* (2013.01)

(58) Field of Classification Search
USPC ....... 359/657, 681, 682, 708–718, 750, 751, 359/754, 755, 797
See application file for complete search history.

(56) References Cited

U.S. PATENT DOCUMENTS

| | | | |
|---|---|---|---|
| 2016/0124191 A1* | 5/2016 | Hashimoto | G02B 13/0045 359/708 |
| 2017/0199355 A1 | 7/2017 | Kitahara et al. | |
| 2017/0276895 A1 | 9/2017 | Sakuma et al. | |
| 2018/0188483 A1* | 7/2018 | Hsieh | G02B 9/64 |
| 2018/0188488 A1* | 7/2018 | Gong | G02B 9/64 |
| 2019/0121084 A1* | 4/2019 | Fang | G02B 9/64 |
| 2019/0121100 A1* | 4/2019 | Song | G02B 13/00 |
| 2019/0146184 A1* | 5/2019 | Xu | G02B 13/0045 359/755 |
| 2019/0146185 A1 | 5/2019 | Chen et al. | |
| 2019/0146188 A1 | 5/2019 | Lyu et al. | |
| 2019/0187442 A1 | 6/2019 | Jia et al. | |
| 2019/0204553 A1* | 7/2019 | Lian | G02B 13/0045 |
| 2019/0278062 A1 | 9/2019 | Chen | |
| 2020/0201002 A1* | 6/2020 | Xu | G02B 13/06 |

FOREIGN PATENT DOCUMENTS

| | | | | |
|---|---|---|---|---|
| CN | 106772946 A | | 5/2017 | |
| CN | 106842481 A | | 6/2017 | |
| CN | 106959505 A | | 7/2017 | |
| CN | 107797232 A | * | 3/2018 | ......... G02B 13/0045 |
| JP | 2003-185904 A | | 7/2003 | |
| JP | 2012-118404 A | | 6/2012 | |
| JP | 2016-194653 A | | 11/2016 | |
| JP | 2016-218139 A | | 12/2016 | |
| JP | 2017-125887 A | | 7/2017 | |
| KR | 10-2011-0071807 A | | 6/2011 | |
| KR | 10-2018-0070870 A | | 6/2018 | |

OTHER PUBLICATIONS

U.S. Appl. No. 16/299,637, filed Mar. 12, 2019, Hag Chul Kim et al., Samsung Electro-Mechanics Co., Ltd.

Korean Office Action issued on Feb. 8, 2024, in counterpart Korean Patent Application No. 10-2018-0115987 (8 pages in English, 5 pages in Korean).

Chinese Office Action issued on Jan. 27, 2024, in counterpart Chinese Patent Application No. 202210140074.X (4 pages in English, 7 pages in Chinese).

* cited by examiner

OPTICAL IMAGING SYSTEM

CROSS-REFERENCE TO RELATED APPLICATIONS

This application is a continuation of application Ser. No. 16/299,637 filed on Mar. 12, 2019, now U.S. Pat. No. 11,422,339 issued on Aug. 23, 2022, and claims the benefit under 35 USC 119 (a) of Korean Patent Application No. 10-2018-0115987 filed on Sep. 28, 2018, in the Korean Intellectual Property Office, the entire disclosures of which are incorporated herein by reference for all purposes.

BACKGROUND

1. Field

The following description relates to an optical imaging system capable of implementing constant optical performance irrespective of changes in ambient temperature.

2. Description of Background

Generally, small-sized surveillance cameras are designed to provide an image obtained based on image information in a surveillance region. For example, a small-sized surveillance camera may be mounted on the front and the rear of a vehicle and may provide drivers with images.

A general small-sized surveillance camera is designed to image obstacles around a vehicle, and has a relatively low resolution, and a range of change in resolution caused by changes in temperature, changes in a range of −40° C. to 80° C., for example, may be high. However, as there has been increased demand for a self-driving function of a vehicle, it has been required to develop a surveillance camera having high pixel density of 12 megapixels or higher and constant optical characteristics in severe temperature conditions, and an optical imaging system appropriate for such a surveillance camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a negative refractive power; a second lens having a negative refractive power; a third lens having a positive refractive power; a fourth lens having a negative refractive power; a fifth lens having a positive refractive power; a sixth lens having a positive refractive power; and a seventh lens having a negative refractive power. At least five of the lenses are made of a plastic material.

The first lens may include a convex object-side surface.
The third lens may include a convex image-side surface.
The fourth lens may include a concave object-side surface.
The fourth lens may include a concave image-side surface.
The fifth lens may include a convex object-side surface.
The sixth lens may include a convex image-side surface.
The seventh lens may include a concave object-side surface.

The seventh lens may include a convex image-side surface.

In another general aspect, an optical imaging system includes a first lens having a negative refractive power; a second lens having a refractive power and having a refractive index less than 1.6; a third lens having a refractive power; a fourth lens having a negative refractive power; a fifth lens having a refractive power; a sixth lens having a refractive power; and a seventh lens having a refractive power and a convex image-side surface.

In the optical imaging system, $-0.65 < f/f2 < -0.1$ may be satisfied, where f is a focal length of the optical imaging system, and f2 is a focal length of the second lens.

In the optical imaging system, $0.25 < f/f3 < 0.65$ may be satisfied, where f is a focal length of the optical imaging system, and f3 is a focal length of the third lens.

In the optical imaging system, $-0.5 < f/f4 < 0.1$ may be satisfied, where f is a focal length of the optical imaging system, and f4 is a focal length of the fourth lens.

In the optical imaging system, $0.25 < f/f6 < 0.65$ may be satisfied, where f is a focal length of the optical imaging system, and f6 is a focal length of the sixth lens.

In the optical imaging system, $-0.5 < f/f7 < -0.1$ may be satisfied, where f is a focal length of the optical imaging system, and f7 is a focal length of the seventh lens.

In another general aspect, a camera module includes an optical imaging system including a first lens having a negative refractive power, a second lens having a refractive power, a third lens having a refractive power, a fourth lens having a negative refractive power, a fifth lens having a refractive power, a sixth lens having a refractive power, a seventh lens having a refractive power, an image sensor; a lens barrel to accommodate the optical imaging system; and a housing configured to accommodate the image sensor, and a linear coefficient of thermal expansion of the lens barrel is different than a linear coefficient of thermal expansion of the housing.

The linear coefficient of thermal expansion of the lens barrel may be within a range of $2 \times 10-5$ to $5 \times 10-5$, and the linear coefficient of thermal expansion of the housing may be within a range of $2 \times 10-5$ to $6 \times 10-5$.

wherein $Nd3 < 1.640$, $Nd4 < 1.640$, $Nd6 < 1.535$, and $Nd7 < 1.640$, where Nd3 is a refractive index of the third lens, Nd4 is a refractive index of the fourth lens, Nd6 is a refractive index of the sixth lens, and Nd7 is a refractive index of the seventh lens The camera module may satisfy $Nd3 < 1.640$, $Nd4 < 1.640$, $Nd6 < 1.535$, and $Nd7 < 1.640$, where Nd3 is a refractive index of the third lens, Nd4 is a refractive index of the fourth lens, Nd6 is a refractive index of the sixth lens, and Nd7 is a refractive index of the seventh lens.

The camera module may satisfy $TL/f < 10$, where f is a focal length of the optical imaging system and TL is a distance from an object-side surface of the first lens to an imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
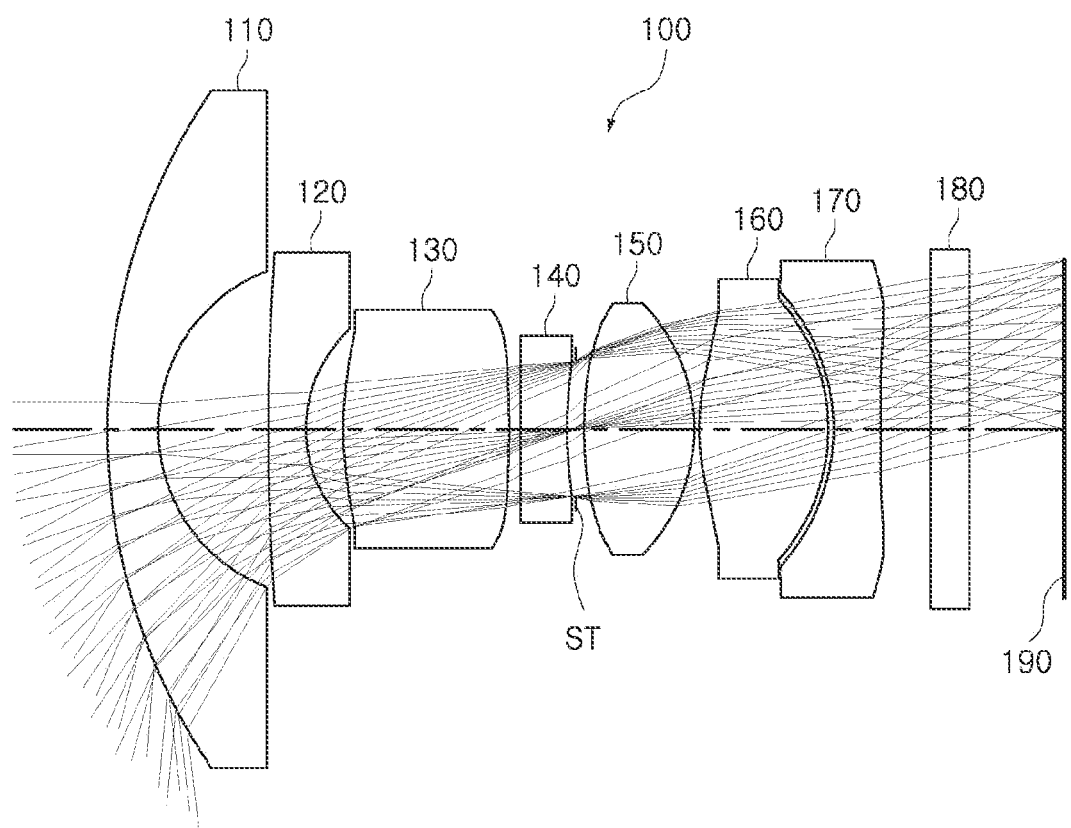
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

In the examples, an entirety of a radius of curvature, a thickness, and a focal length of a lens are indicated in millimeters (mm). Further, a thickness of a lens, and a gap between lenses are distances measured based on an optical axis of the lens.

In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge region of the lens may be concave. In a similar manner, in a configuration in which a surface of a lens is described as being concave, an edge region of the lens may be convex.

In the examples, an optical imaging system may include a plurality of lenses. For example, the optical imaging system may include seven lenses. In the following descriptions, the lenses of the optical imaging system will be described.

The first lens may have a refractive power. For example, the first lens may have a negative refractive power.

The first lens may have a convex surface. For example, the first lens may have a convex object-side surface.

The first lens may include a spherical surface. For example, both surfaces of the first lens may be spherical. The first lens may be made of a material having high light transmissivity and excellent workability. For example, the first lens may be made of a plastic material or a glass material.

The first lens may have a certain refractive index. For example, a refractive index of the first lens may be 1.5 or higher. The first lens may have an Abbe number smaller than an Abbe number of the second lens. For example, an Abbe number of the first lens may be less than 56.

The second lens may have a refractive power. For example, the second lens may have a negative refractive power.

The second lens may have a concave surface. For example, the second lens may have a concave image-side surface.

The second lens may include a spherical surface. For example, both surfaces of the second lens may be spherical. The second lens may have a certain refractive index. For example, a refractive index of the second lens may be 1.6 or less. The second lens may have an Abbe number higher than an Abbe number of the first lens.

The third lens may have a refractive power. For example, the third lens may have a positive refractive power.

The third lens may have a convex surface. For example, the third lens may have a convex image-side surface.

The third lens may include an aspherical surface. For example, both surfaces of the third lens may be aspherical. The third lens may be made of a material having high light transmissivity and excellent workability. For example, the third lens may be made of a plastic material.

The third lens may have a certain refractive index. For example, a refractive index of the third lens may be 1.60 or higher. The third lens may have an Abbe number lower than an Abbe number of the first lens. For example, an Abbe number of the third lens may be less than 30.

The fourth lens may have a refractive power. For example, the fourth lens may have a negative refractive power.

The fourth lens may have a concave surface. For example, an object-side surface or an image-side surface of the fourth lens may be concave.

The fourth lens may include a spherical surface. For example, both surfaces of the fourth lens may be spherical.

The fourth lens may be made of a material having high light transmissivity and excellent workability. For example, the fourth lens may be made of a plastic material.

The fourth lens may have a certain refractive index. For example, a refractive index of the fourth lens may be 1.6 or higher. The fourth lens may have an Abbe number lower than an Abbe number of the first lens. For example, an Abbe number of the fourth lens may be less than 30.

The fifth lens may have a refractive power. For example, the fifth lens may have a positive refractive power.

The fifth lens may have a convex surface. For example, the fifth lens may have a convex object-side surface.

The fifth lens may include a spherical surface. For example, both surfaces of the fifth lens may be spherical. The fifth lens may be made of a material having high light transmissivity and excellent workability. For example, the fifth lens may be made of a glass material or a plastic material.

The fifth lens may have a certain refractive index. For example, a refractive index of the fifth lens may be less than 1.6. The fifth lens may have an Abbe number higher than or the same as Abbe numbers of adjacent lenses (the fourth lens and the sixth lens).

The sixth lens may have a refractive power. For example, the sixth lens may have a positive refractive power.

The sixth lens may have a convex surface. For example, the sixth lens may have a convex image-side surface.

The sixth lens may include an aspherical surface. For example, an image-side surface of the sixth lens may be aspherical. The sixth lens may be made of a material having high light transmissivity and excellent workability. For example, the sixth lens may be made of a plastic material.

The sixth lens may have a certain refractive index. For example, a refractive index of the sixth lens may less than 1.6. The sixth lens may have an Abbe number higher than an Abbe number of the seventh lens. For example, an Abbe number of the sixth lens may be 50 or higher.

The seventh lens may have a refractive power. For example, the seventh lens may have a negative refractive power.

The seventh lens may have a convex surface. For example, the seventh lens may have a convex image-side surface.

The seventh lens may include an aspherical surface. For example, both surfaces of the seventh lens may be aspherical. The seventh lens may be made of a material having a constant refractive index irrespective of temperature change. For example, the seventh lens may be made of a glass material.

The seventh lens may have a certain refractive index. For example, a refractive index of the seventh lens may be 1.60 or higher. The seventh lens may have an Abbe number lower than an Abbe number of the sixth lens. For example, an Abbe number of the seventh lens may be less than 30.

The optical imaging system may include one or more aspherical lenses. For example, one or more of the first to seventh lenses may include aspherical surfaces. The optical imaging system including one or more aspherical lenses may be desirable in order to implement high resolution. The aspherical surface may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} \quad (1)$$

In Equation 1, "c" is an inverse of a radius of a curvature of a respective lens, "K" is a conic constant, "r" is a distance from a certain point on an aspherical surface of the lens to an optical axis, "A" to "H" are aspheric constants, "Z" (or SAG) is a height from a certain point on an aspherical surface of the lens to an apex of the aspherical surface in an optical axis direction.

The optical imaging system may include an image sensor. The image sensor may be configured to implement a high level of resolution. A surface of the image sensor may form an imaging plane on which a subject is imaged.

The optical imaging system may include a stop. The stop may be disposed between lenses. For example, the stop may be disposed between the fourth lens and the fifth lens. The stop may adjust the amount of light incident to an image sensor.

The optical imaging system may include a filter. The filter may be disposed between the seventh lens and the image sensor and may remove elements which may degrade resolution. For example, the filter may block light having infrared wavelengths. The filter may have a certain refractive index. For example, a refractive index of the filter may be 1.50 or higher. The filter may have an Abbe number approximately similar to an Abbe number of the sixth lens. For example, an Abbe number of the filter may be 60 or higher.

The optical imaging system may include five or more of lenses having a plastic material to reduce manufacturing costs. Also, the optical imaging system may have a relatively wide field of view of 170° or higher. Thus, the optical imaging system may be employed in a camera requiring a relatively wide field of view such as a surveillance camera for a drone as well as in a surveillance camera of a vehicle.

The optical imaging system may satisfy one or more of the following conditional expressions below:

$-0.65 < f/f2 < -0.1$ (Conditional Expression 1)

$0.25 < f/f3 < 0.65$ (Conditional Expression 2)

$-0.5 < f/f4 < 0.1$ (Conditional Expression 3)

$0.25 < f/f6 < 0.65$ (Conditional Expression 4)

$-0.5 < f/f7 < -0.1$ (Conditional Expression 5)

$Nd3 < 1.640$ (Conditional Expression 6)

$Nd4 < 1.640$ (Conditional Expression 7)

$Nd6 < 1.535$ (Conditional Expression 8)

$Nd7 < 1.640$ (Conditional Expression 9)

$TL/f < 10$ (Conditional Expression 10)

$0.25 < (D12+D23+D34+D45+D56+D67)/f$ (Conditional Expression 11)

$20 < Dmax/Dmin < 25$ (Conditional Expression 12)

In the conditional expressions, f is a focal length of the optical imaging system, f2 is a focal length of the second lens, f3 is a focal length of the third lens, f4 is a focal length of the fourth lens, f6 is a focal length of the sixth lens, f7 is a focal length of the seventh lens, Nd3 is a refractive index of the third lens, Nd4 is a refractive index of the fourth lens, Nd6 is a refractive index of the sixth lens, Nd7 is a refractive index of the seventh lens, TL is a distance from an object-side surface of the first lens to an imaging plane, D12 is a distance from an image-side surface of the first lens to an object-side surface of the second lens, D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, D56 is a distance from an image-side surface of the fifth lens to an object-side surface of the sixth lens, D67 is a distance from an image-side surface of the sixth lens to an object-side surface of the seventh lens, Dmax is the greatest value among D12, D23, D34, D45, D56, and D67, and Dmin is the smallest value among D12, D23, D34, D45, D56, and D67.

In the description below, an optical imaging system will be described in accordance with examples.

An example of an optical imaging system will be described with reference to FIG. 1.

The optical imaging system 100 may include a plurality of lenses each having a refractive power. For example, the optical imaging system 100 may include a first lens 110, a second lens 120, a third lens 130, a fourth lens 140, a fifth lens 150, a sixth lens 160, and a seventh lens 170.

The first lens 110 may have a negative refractive power, and may have a convex object-side surface and a concave image-side surface. The second lens 120 may have a negative refractive power, and may have a convex object-side surface and a concave image-side surface. The third lens 130 may have a positive refractive power, and may have a convex object-side surface and a convex image-side surface. The fourth lens 140 may have a negative refractive power, and may have a concave object-side surface and a concave image-side surface. The fifth lens 150 may have a positive refractive power, and may have a convex object-side surface and a convex image-side surface. The sixth lens 160 may have a positive refractive power, and may have a convex object-side surface and a convex image-side surface. The seventh lens 170 may have a negative refractive power, and may have a concave object-side surface and a convex image-side surface.

The optical imaging system 100 may include a plurality of aspherical lenses. In the example, both surfaces of the third lens 130, an image-side surface of the sixth lens 160, and an image-side surface of the seventh lens 170 may be aspherical. The optical imaging system 100 may include a lens made of a glass material to exhibit constant optical performance even when temperature changes due to external conditions. In the example, the first lens 110 and the fifth lens 150 may be made of a glass material. The optical imaging system 100 may include a plurality of plastic lenses to reduce manufacturing costs and a weight of a product. In the example, the second to fourth lenses 120, 130, and 140, the sixth lens 160, and the seventh lens 170 may be made of a plastic material.

The optical imaging system 100 may include a stop ST. The stop ST may be disposed between the fourth lens 140 and the fifth lens 150. The optical imaging system 100 may include a filter 180. The filter 180 may be disposed between the seventh lens 170 and an imaging plane 190. The filter 180 may block infrared light, and may prevent contamination of the imaging plane caused by foreign objects.

The optical imaging system 100 may have a relatively wide field of view. For example, a total field of view of the optical imaging system 100 may be 194°. The optical imaging system 100 may have a relatively low F No. while having a relatively wide field of view. The F No. of the optical imaging system 100 may be 2.05. A focal length of the optical imaging system 100 may be 2.2 mm, and a total length TL may be 19.50 mm.

Figure 2:
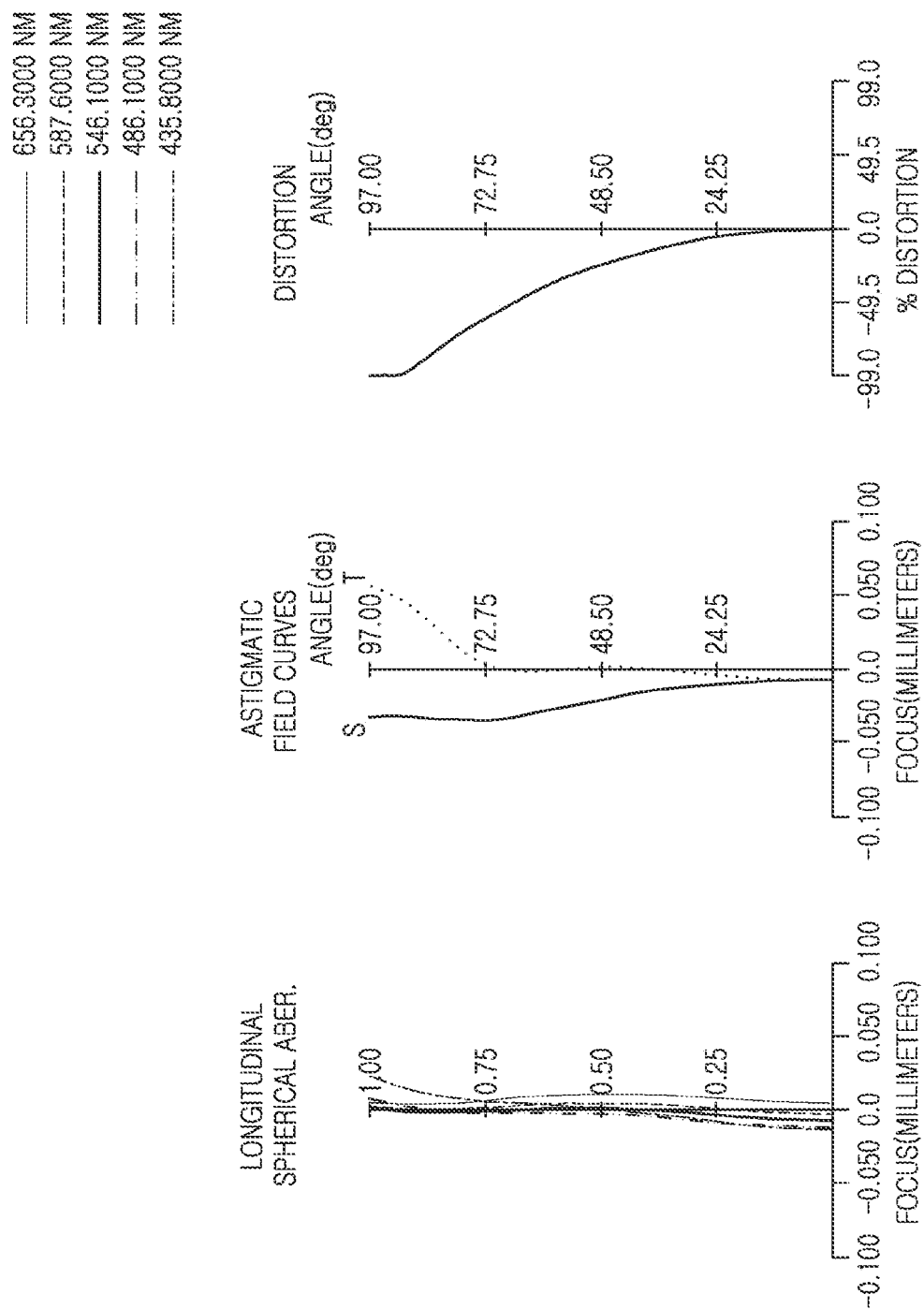
FIG. 2 illustrates aberration curves of the optical imaging system illustrated in FIG. 1.

Table 1 lists characteristics of the lenses of the optical imaging system 100. In Table 1, a surface marked with an asterisk "*" is an aspherical surface. FIG. 2 shows aberration curves of the optical imaging system 100.

TABLE 1

| Surface No. | Element | Radius of Curvature | Thickness/ Distance | Refractive Index | Abbe No. | Focal Length |
|---|---|---|---|---|---|---|
| S1 | First | 12.559 | 1.050 | 1.773 | 49.60 | −6.518 |
| S2 | Lens | 3.463 | 2.235 | | | |
| S3 | Second | 71.168 | 0.750 | 1.544 | 56.00 | −5.353 |
| S4 | Lens | 2.788 | 0.761 | | | |
| S5* | Third | 8.794 | 3.400 | 1.632 | 23.00 | 7.554 |
| S6* | Lens | −8.881 | 0.220 | | | |
| S7 | Fourth | −33.05 | 0.950 | 1.632 | 23.00 | −10.545 |

TABLE 1-continued

| Surface No. | Element | Radius of Curvature | Thickness/ Distance | Refractive Index | Abbe No. | Focal Length |
|---|---|---|---|---|---|---|
| S8 | Lens | 8.441 | 0.140 | | | |
| S9 | Stop | Infinity | 0.200 | | | |
| S10 | Fifth | 6.376 | 2.258 | 1.497 | 81.50 | 5.200 |
| S11 | Lens | −3.837 | 0.100 | | | |
| S12 | Sixth | 5.007 | 2.660 | 1.531 | 55.70 | 4.920 |
| S13* | Lens | −4.459 | 0.100 | | | |
| S14 | Seventh | −3.971 | 0.950 | 1.632 | 23.00 | −7.080 |
| S15* | Lens | −38.58 | 1.000 | | | |
| S16 | Filter | Infinity | 0.800 | 1.517 | 64.10 | |
| S17 | | Infinity | 1.926 | | | |
| S18 | Imaging Plane | Infinity | 0.000 | | | |

Figure 3:
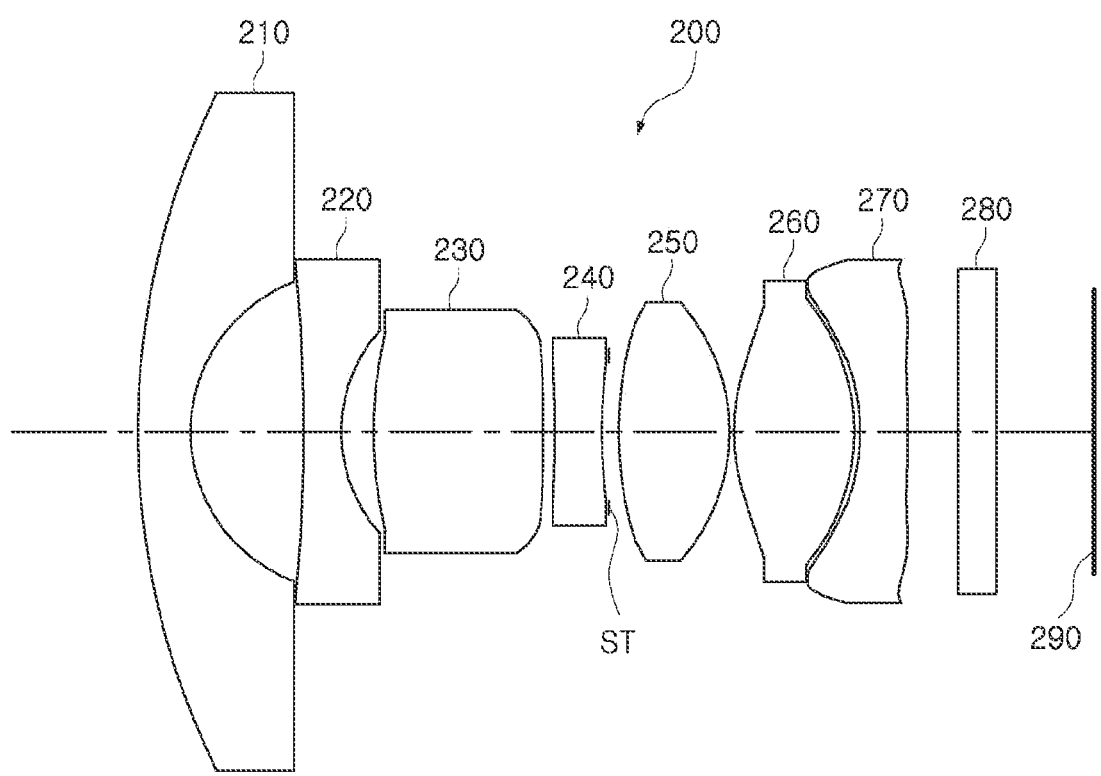
FIG. 3 is a diagram illustrating a second example of an optical imaging system.

In the following description, a second example of an optical imaging system will be described with reference to FIG. 3.

An optical imaging system 200 may include a plurality of lenses each having a refractive power. For example, the optical imaging system 200 may include a first lens 210, a second lens 220, a third lens 230, a fourth lens 240, a fifth lens 250, a sixth lens 260, and a seventh lens 270.

The first lens 210 may have a negative refractive power, and may have a convex object-side surface and a concave image-side surface. The second lens 220 may have a negative refractive power, and may have a concave object-side surface and a concave image-side surface. The third lens 230 may have a positive refractive power, and may have a convex object-side surface and a convex image-side surface. The fourth lens 240 may have a negative refractive power, and may have a concave object-side surface and a concave image-side surface. The fifth lens 250 may have a positive refractive power, and may have a convex object-side surface and a convex image-side surface. The sixth lens 260 may have a positive refractive power, and may have a convex object-side surface and a convex image-side surface. The seventh lens 270 may have a negative refractive power, and may have a concave object-side surface and a convex image-side surface.

The optical imaging system 200 may include a plurality of aspherical lenses. In the example, both surfaces of the third lens 230, an image-side surface of the sixth lens 260, and an image-side surface of the seventh lens 270 may be aspherical. The optical imaging system 200 may include a lens made of a glass material to exhibit constant optical performance even when temperature changes by external conditions. In the example, the fifth lens 250 may be made of a glass material. The optical imaging system 200 may include a plurality of plastic lenses to reduce manufacturing costs and a weight of a product. In the example, the first to fourth lenses 210, 220, 230, and 240, the sixth lens 260, and the seventh lens 270 may be made of a plastic material.

The optical imaging system 200 may include a stop ST. The stop ST may be disposed between the fourth lens 240 and the fifth lens 250. The optical imaging system 200 may include a filter 280. The filter 280 may be disposed between the seventh lens 270 and an imaging plane 290. The filter 280 may block infrared light, and may prevent contamination of the imaging plane caused by foreign objects.

The optical imaging system 200 may have a relatively wide field of view. For example, a total field of view of the optical imaging system 200 may be 170°. The optical imaging system 200 may have a relatively low F No. while having a relatively wide field of view. The F No. of the optical imaging system 200 may be 1.95. A focal length of the optical imaging system 200 may be 2.2 mm, and a total length TL may be 19.124 mm.

Figure 4:
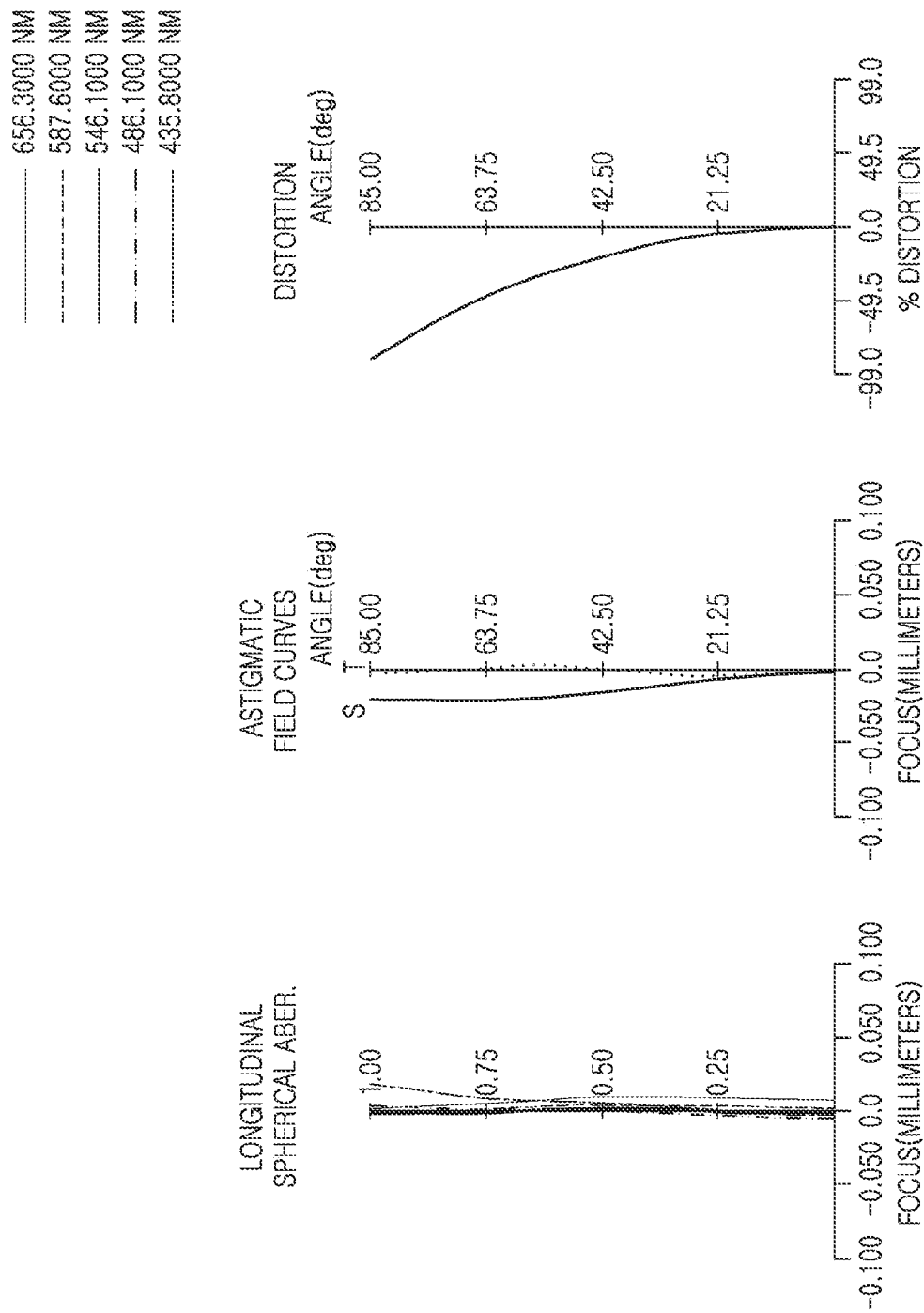
FIG. 4 illustrates aberration curves of the optical imaging system illustrated in FIG. 3.

Table 2 lists characteristics of the lenses of the optical imaging system 200. In Table 2, a surface marked with an asterisk "*" is an aspherical surface. FIG. 4 shows aberration curves of the optical imaging system 200.

TABLE 2

| Surface No. | Element | Radius of Curvature | Thickness/ Distance | Refractive Index | Abbe No. | Focal Length |
|---|---|---|---|---|---|---|
| S1 | First | 15.500 | 1.050 | 1.531 | 55.70 | −7.788 |
| S2 | Lens | 3.188 | 2.250 | | | |
| S3 | Second | −33.203 | 0.750 | 1.544 | 56.00 | −5.054 |
| S4 | Lens | 3.022 | 0.661 | | | |
| S5* | Third | 8.102 | 3.400 | 1.632 | 23.00 | 8.033 |
| S6* | Lens | −11.389 | 0.220 | | | |
| S7 | Fourth | −23.59 | 0.950 | 1.632 | 23.00 | −11.168 |
| S8 | Lens | 10.230 | 0.140 | | | |
| S9 | Stop | Infinity | 0.200 | | | |
| S10 | Fifth | 6.945 | 2.215 | 1.497 | 81.50 | 5.583 |
| S11 | Lens | −4.133 | 0.100 | | | |
| S12 | Sixth | 4.121 | 2.411 | 1.531 | 55.70 | 4.364 |
| S13* | Lens | −4.222 | 0.100 | | | |
| S14 | Seventh | −3.729 | 0.950 | 1.632 | 23.00 | −7.003 |
| S15* | Lens | −26.01 | 1.000 | | | |
| S16 | Filter | Infinity | 0.800 | 1.517 | 64.10 | |
| S17 | | Infinity | 1.926 | | | |
| S18 | Imaging Plane | Infinity | 0.000 | | | |

Figure 5:
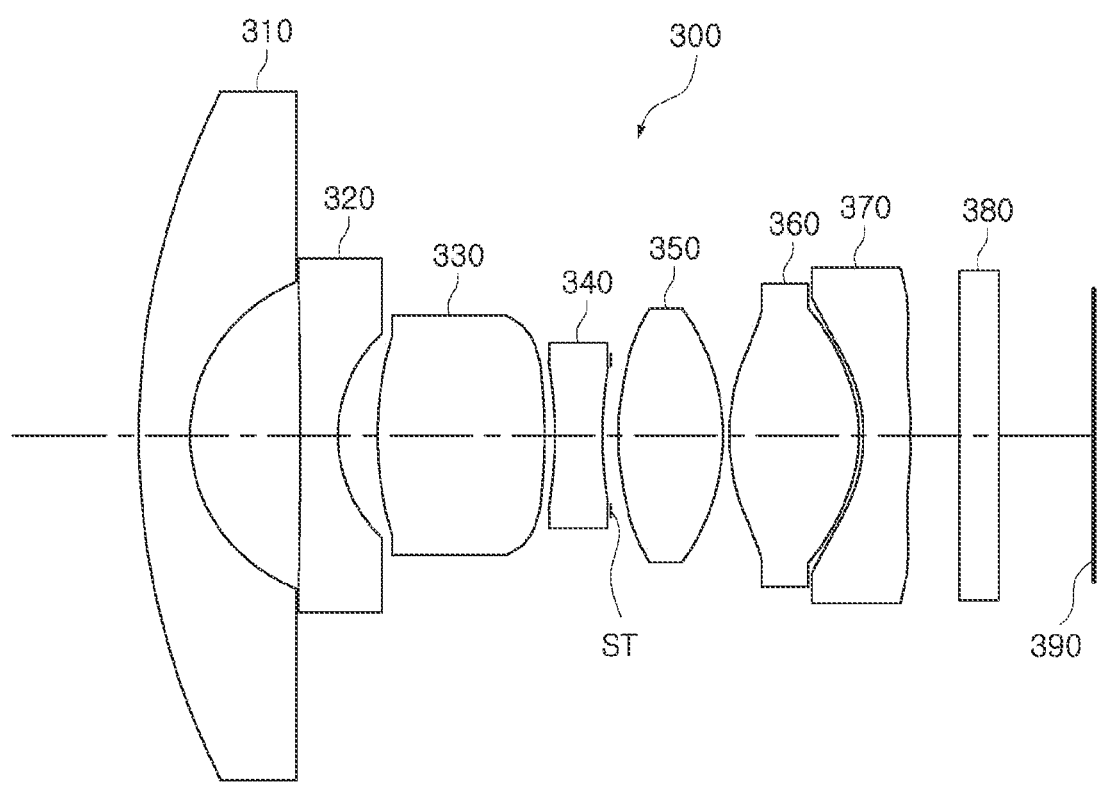
FIG. 5 is a diagram illustrating a third example of an optical imaging system.

In the following description, a third example of an optical imaging system will be described with reference to FIG. 5.

An optical imaging system 300 may include a plurality of lenses each having a refractive power. For example, the optical imaging system 300 may include a first lens 310, a second lens 320, a third lens 330, a fourth lens 340, a fifth lens 350, a sixth lens 360, and a seventh lens 370.

The first lens 310 may have a negative refractive power, and may have a convex object-side surface and a concave image-side surface. The second lens 320 may have a negative refractive power, and may have a concave object-side surface and a concave image-side surface. The third lens 330 may have a positive refractive power, and may have a convex object-side surface and a convex image-side surface. The fourth lens 340 may have a negative refractive power, and may have a concave object-side surface and a concave image-side surface. The fifth lens 350 may have a positive refractive power, and may have a convex object-side surface and a convex image-side surface. The sixth lens 360 may have a positive refractive power, and may have a convex object-side surface and a convex image-side surface. The seventh lens 370 may have a negative refractive power, and may have a concave object-side surface and a convex image-side surface.

The optical imaging system 300 may include a plurality of aspherical lenses. In the example, both surfaces of the third lens 330, an image-side surface of the sixth lens 360, and an image-side surface of the seventh lens 370 may be aspherical. The optical imaging system 300 may include a lens made of a glass material to exhibit constant optical performance even when temperature changes by external conditions. In the example, the fifth lens 350 may be made of a glass material. The optical imaging system 300 may include a plurality of plastic lenses to reduce manufacturing costs and a weight of a product. In the example, the first to fourth lenses 310, 320, 330, and 340, the sixth lens 360, and the seventh lens 370 may be made of a plastic material.

The optical imaging system 300 may include a stop ST. The stop ST may be disposed between the fourth lens 340 and the fifth lens 350. The optical imaging system 300 may include a filter 380. The filter 380 may be disposed between the seventh lens 370 and an imaging plane 390. The filter 380 may block infrared light, and may prevent contamination of the imaging plane caused by foreign objects.

The optical imaging system 300 may have a relatively wide field of view. For example, a total field of view of the optical imaging system 300 may be 170°. The optical imaging system 300 may have a relatively low F No. while having a relatively wide field of view. The F No. of the optical imaging system 300 may be 1.89. A focal length of the optical imaging system 300 may be 2.2 mm, and a total length TL may be 19.446 mm.

Figure 6:
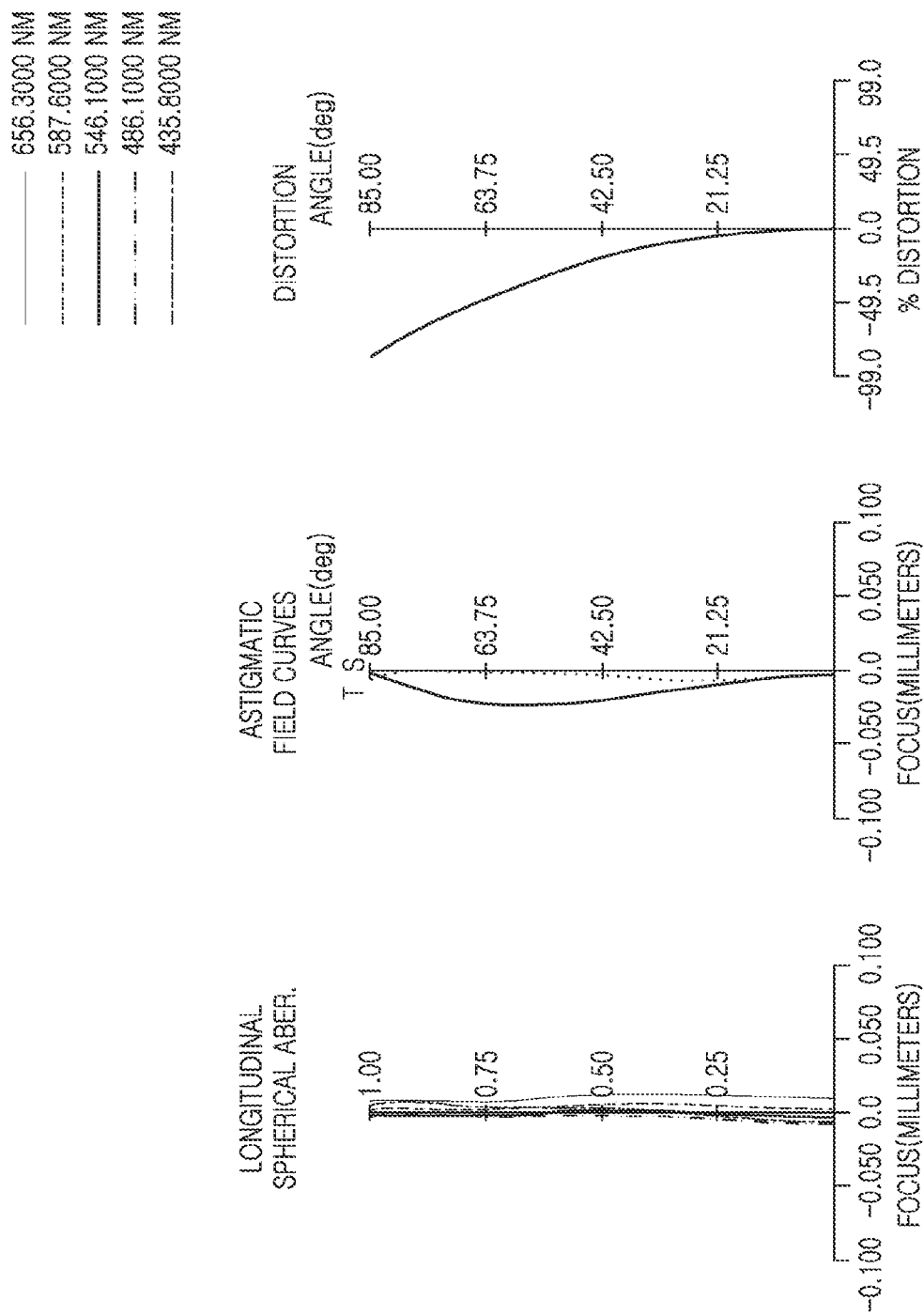
FIG. 6 illustrates aberration curves of the optical imaging system illustrated in FIG. 5.

Table 3 lists characteristics of the lenses of the optical imaging system 300. In Table 3, a surface marked with an asterisk "*" is an aspherical surface. FIG. 6 shows aberration curves of the optical imaging system 300.

TABLE 3

| Surface No. | Element | Radius of Curvature | Thickness/ Distance | Refractive Index | Abbe No. | Focal Length |
|---|---|---|---|---|---|---|
| S1 | First | 15.500 | 1.050 | 1.531 | 55.70 | −8.218 |
| S2 | Lens | 3.326 | 2.250 | | | |
| S3 | Second | −124.873 | 0.750 | 1.544 | 56.00 | −5.125 |
| S4 | Lens | 2.858 | 0.817 | | | |
| S5* | Third | 6.939 | 3.400 | 1.632 | 23.00 | 6.519 |
| S6* | Lens | −8.216 | 0.220 | | | |
| S7 | Fourth | −9.43 | 0.950 | 1.632 | 23.00 | −5.957 |
| S8 | Lens | 6.512 | 0.140 | | | |
| S9 | Stop | Infinity | 0.200 | | | |
| S10 | Fifth | 5.951 | 2.151 | 1.531 | 55.70 | 5.300 |
| S11 | Lens | −4.672 | 0.100 | | | |
| S12 | Sixth | 3.748 | 2.642 | 1.531 | 55.70 | 3.801 |
| S13* | Lens | −3.305 | 0.100 | | | |
| S14 | Seventh | −2.874 | 0.950 | 1.632 | 23.00 | −6.274 |
| S15* | Lens | −11.78 | 1.000 | | | |
| S16 | Filter | Infinity | 0.800 | 1.517 | 64.10 | |
| S17 | | Infinity | 1.926 | | | |
| S18 | Imaging Plane | Infinity | 0.000 | | | |

Table 4 lists values of the conditional expressions of the optical imaging systems of the first to third examples.

TABLE 4

| Conditional Expressions | First Example | Second Example | Third Example |
|---|---|---|---|
| f/f2 | −0.4110 | −0.4353 | −0.4293 |
| f/f3 | 0.2912 | 0.2739 | 0.3375 |
| f/f4 | −0.2086 | −0.1970 | −0.3693 |
| f/f6 | 0.4471 | 0.5041 | 0.5788 |
| f/f7 | −0.3107 | −0.3141 | −0.3507 |
| Nd2 | 1.5441 | 1.5441 | 1.5441 |
| Nd3 | 1.6320 | 1.6320 | 1.6320 |
| Nd4 | 1.6320 | 1.6320 | 1.6320 |
| Nd6 | 1.5311 | 1.5311 | 1.5311 |
| Nd7 | 1.6320 | 1.6320 | 1.6320 |
| TL/f | 8.8636 | 8.6926 | 8.8391 |
| (D12 + D23 + D34 + D45 + D56 + D67)/6 | 0.6260 | 0.6119 | 0.6379 |
| Dmax/Dmin | 22.350 | 22.500 | 22.500 |

In the following description, an example of a camera module will be described with reference to FIG. 7.

Figure 7:
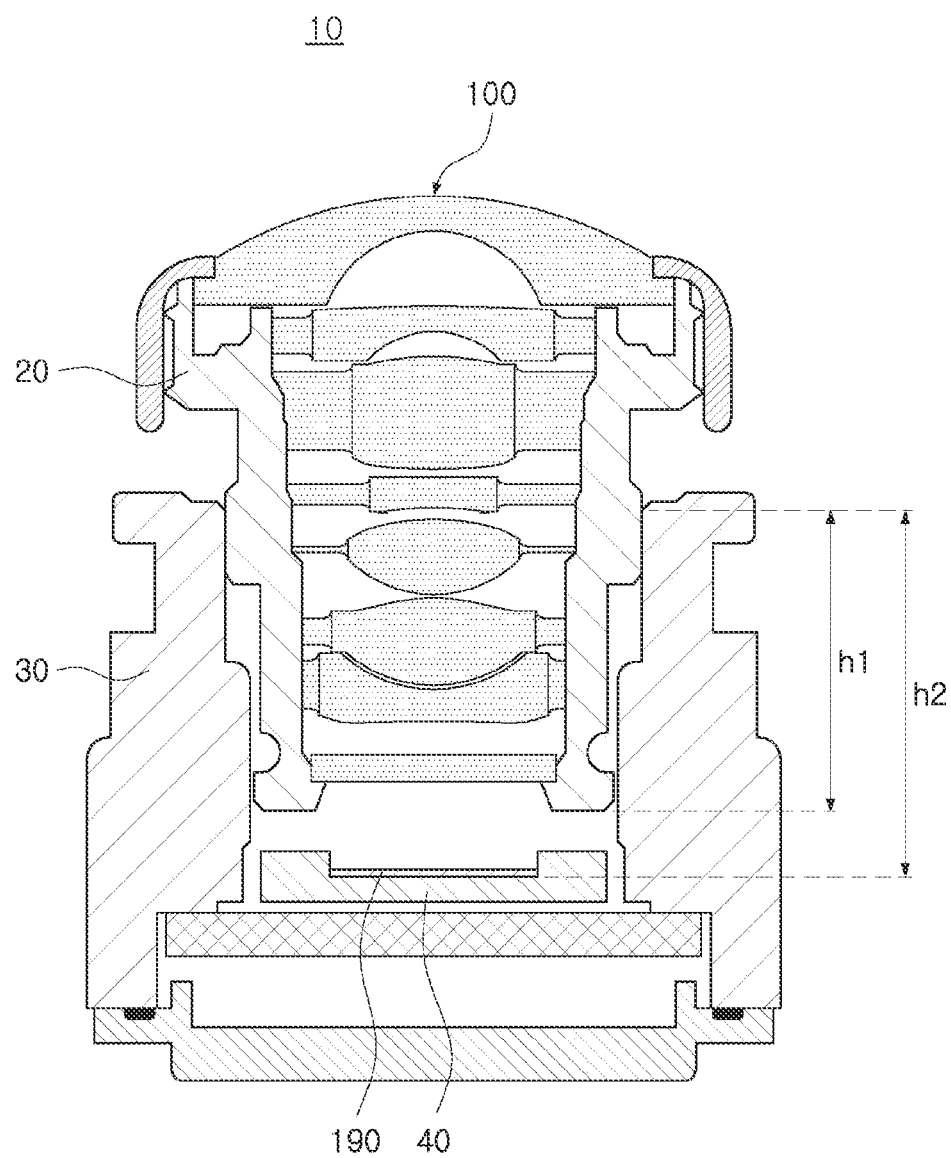
FIG. 7 is a cross-sectional diagram of a camera module including an optical imaging system.

A camera module 10 may include one or more optical imaging systems of the aforementioned examples (the optical imaging system illustrated in FIG. 7 is the first example of the optical imaging system). The camera module 10 may be configured such that constant optical performance of the optical imaging system may be maintained irrespective of temperature change. For example, the camera module 10 may include a lens barrel 20 and a housing 30 having different linear coefficients of thermal expansion. A linear coefficient of thermal expansion of the lens barrel 20 may be within a range of 2×10−5 to 5×10−5, and a linear coefficient of thermal expansion of the housing 30 may be within a range of 2×10−5 to 6×10−5.

The camera module 10 may be configured such that a lens unit and an imaging plane (an image sensor 190) of the optical imaging system 100 may be disposed separately. For example, the lens unit of the optical imaging system 100 may be disposed in the lens barrel 20, and the imaging plane 190 may be disposed in the housing 30. The housing 30 may further include a substrate 40 to support the imaging plane 190.

A length of the lens barrel 20 may be determined in consideration of changes in back focus length (BFL) of the optical imaging system 100 depending on temperature change. For example, a length h1 from a bonding position of the lens barrel 20 and the housing 30 to a lower end of the lens barrel 20 may be determined in consideration of the BFL of the optical imaging system 100, a linear coefficient of thermal expansion of the lens barrel 20, and the like. Also, the length h1 from a bonding position of the lens barrel 20 and the housing 30 to a lower end of the lens barrel 20 may be determined by a difference in linear coefficients of thermal expansion between the lens barrel 20 and the housing 30.

The bonding position of the lens barrel 20 and the housing 30 may also be determined in consideration of changes in back focus length (BFL) of the optical imaging system 100 depending on temperature change. For example, a length h2 from the imaging plane 190 to the bonding position may be determined in consideration of the BFL of the optical imaging system 100 and a linear coefficient of thermal expansion of the lens barrel 20. Also, the length h2 from the imaging plane 190 to the bonding position may be determined by a difference in linear coefficients of thermal expansion between the lens barrel 20 and the housing 30.

According to the aforementioned examples, the optical imaging system may implement an image having high pixel density and high resolution in severe temperature conditions. The examples provide an optical imaging system implementing an image having high pixel density and high resolution in severe temperature conditions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having a refractive power and a convex object-side surface in an optical axis region thereof;
a second lens having a negative refractive power;
a third lens having a refractive power and a convex object-side surface in an optical axis region thereof;
a fourth lens having a refractive power;
a fifth lens having a refractive power and a convex object-side surface in an optical axis region thereof;
a sixth lens having a positive refractive power; and
a seventh lens having a negative refractive power,
wherein the first to seventh lenses are sequentially disposed in ascending numerical order along an optical axis of the optical imaging system from an object side of the optical imaging system toward an imaging plane of the optical imaging system,
the optical imaging system has a total of seven lenses having a refractive power,
$0.25 < (D12+D23+D34+D45+D56+D67)/6 < 0.7$, where D12 is a distance along the optical axis from an image-side surface of the first lens to an object-side surface of the second lens, D23 is a distance along the optical axis from an image-side surface of the second lens to the object-side surface of the third lens, D34 is a distance along the optical axis from an image-side surface of the third lens to an object-side surface of the fourth lens, D45 is a distance along the optical axis from an image-side surface of the fourth lens to the object-side surface of the fifth lens, D56 is a distance along the optical axis from an image-side surface of the fifth lens to an object-side surface of the sixth lens, and D67 is a distance along the optical axis from an image-side surface of the sixth lens to an object-side surface of the seventh lens,
a radius of curvature of the object-side surface of the third lens on the optical axis is greater than a radius of curvature of the object-side surface of the fifth lens on the optical axis,
a radius of curvature of the image-side surface of the third lens on the optical axis is greater than a radius of curvature of an image-side surface of the seventh lens on the optical axis,
a radius of curvature of the object-side surface of the fourth lens on the optical axis is greater than a radius of curvature of the image-side surface of the seventh lens on the optical axis, and
D23 is greater than a thickness of the second lens along the optical axis.

2. The optical imaging system of claim 1, wherein the image-side surface of the first lens is concave in an optical axis region thereof.

3. The optical imaging system of claim 1, wherein the object-side surface of the second lens is convex in an optical axis region thereof.

4. The optical imaging system of claim 1, wherein the image-side surface of the second lens is concave in an optical axis region thereof.

5. The optical imaging system of claim 1, wherein the third lens has a positive refractive power.

6. The optical imaging system of claim 1, wherein the fourth lens has a negative refractive power.

7. The optical imaging system of claim 1, wherein the object-side surface of the fourth lens is concave in an optical axis region thereof.

8. The optical imaging system of claim 1, wherein the image-side surface of the fourth lens is concave in an optical axis region thereof.

9. The optical imaging system of claim 1, wherein the image-side surface of the fifth lens is convex in an optical axis region thereof.

10. The optical imaging system of claim 1, wherein the object-side surface of the seventh lens is concave in an optical axis region thereof.

11. The optical imaging system of claim 1, wherein $-0.65 < f/f2 < -0.1$, where f is a focal length of the optical imaging system, and f2 is a focal length of the second lens.

12. The optical imaging system of claim 1, wherein $0.25 < f/f3 < 0.65$, where f is a focal length of the optical imaging system, and f3 is a focal length of the third lens.

13. The optical imaging system of claim 1, wherein $-0.5 < f/f4 < 0.1$, where f is a focal length of the optical imaging system, and f4 is a focal length of the fourth lens.

14. The optical imaging system of claim 1, wherein $TL/f < 10$, where TL is a distance along the optical axis from the object-side surface of the first lens to the imaging plane, and f is a focal length of the optical imaging system.

* * * * *